United States Patent [19]
Scheiber

[11] 3,946,125
[45] *Mar. 23, 1976

[54] METHOD FOR INTERNALLY COATING DUCTS WITH SYNTHETIC RESIN

[75] Inventor: Werner Scheiber, Frankfurt am Main, Germany

[73] Assignee: Metallgesellschaft Aktiengesellschaft, Frankfurt am Main, Germany

[ * ] Notice: The portion of the term of this patent subsequent to Mar. 4, 1992, has been disclaimed.

[22] Filed: May 28, 1974

[21] Appl. No.: 474,081

Related U.S. Application Data

[63] Continuation of Ser. No. 191,940, Oct. 22, 1971, Pat. No. 3,869,300.

[30] Foreign Application Priority Data

| Oct. 24, 1970 | Germany | 2052314 |
|---|---|---|
| Dec. 3, 1970 | Germany | 2059548 |
| Sept. 4, 1971 | Germany | 2144342 |
| Sept. 4, 1971 | Germany | 2144377 |

[52] U.S. Cl. ............ 427/46; 118/63; 118/312; 118/317; 118/DIG. 5; 118/DIG. 10; 118/DIG. 11; 427/181; 427/182; 427/195; 427/235; 427/345; 427/374

[51] Int. Cl.$^2$.... B05B 3/02; B05D 7/22; B05D 5/00

[58] Field of Search ............ 117/17, 18, 19, 21, 96, 117/97, 102 A, DIG. 6; 118/63, 312, 317, DIG. 5, DIG. 10, DIG. 11; 427/46, 181, 182, 195, 235, 345, 374

[56] References Cited
UNITED STATES PATENTS

| 3,004,861 | 10/1961 | Davis | 117/21 |
|---|---|---|---|
| 3,063,860 | 11/1962 | Gemmer | 117/DIG. 6 |
| 3,074,808 | 11/1962 | Harrison | 117/21 |
| 3,108,022 | 10/1963 | Church | 117/DIG. 6 |
| 3,161,530 | 12/1964 | Strobel | 117/18 |
| 3,186,860 | 6/1965 | Jones | 117/DIG. 6 |
| 3,208,868 | 9/1965 | Strobel et al. | 117/18 |
| 3,208,869 | 9/1965 | Starr et al. | 117/DIG. 6 |
| 3,218,184 | 11/1965 | Lemelson | 117/DIG. 6 |
| 3,294,573 | 12/1966 | Michael et al. | 117/49 |
| 3,439,649 | 4/1969 | Probst et al. | 117/17 |
| 3,484,276 | 12/1969 | Burggraaf et al. | 117/95 |
| 3,508,946 | 4/1970 | Plueddemann et al. | 117/18 |
| 3,869,300 | 3/1975 | Scheiber | 117/17 |

FOREIGN PATENTS OR APPLICATIONS

| 250,540 | 11/1966 | Austria |
|---|---|---|
| 25,280 | 5/1963 | Germany |

*Primary Examiner*—Ronald H. Smith
*Assistant Examiner*—Shrive P. Beck
*Attorney, Agent, or Firm*—Karl F. Ross; Herbert Dubno

[57] ABSTRACT

A method of and an apparatus for the internal coating of ducts with a synthetic resin, especially long steel pipes or tubes, in which gas-entrained synthetic-resin particles are passed through the tube while the latter is heated progressively by displacing the tube relative to a surrounding induction-heating coil. Thereafter, a gas stream free from particles is used to clear the interior of the tube.

2 Claims, 7 Drawing Figures

METHOD FOR INTERNALLY COATING DUCTS WITH SYNTHETIC RESIN

This application is a continuation of application Ser. No. 191,940 filed 22 Oct. 1971, now U.S. Pat. No. 3,869,300 issued 4 March 1975.

FIELD OF THE INVENTION

The present invention relates to a method of coating pipes, tubes, ducts and conduits with protective coatings, especially thermally flowable or thermoplastic synthetic resins. More particularly, the invention is concerned with a method of externally and/or internally coating pipes and tubes with corrosion-resistant synthetic resins.

BACKGROUND OF THE INVENTION

Aside from techniques for dipping a pipe, tube or conduit into a bath of a molten or solvent-liquefied synthetic-resin and removing the coated body therefrom, several methods have been suggested for the coating of such objects with thermoplastic synthetic-resin materials. For example, it has been suggested to fill a tube or pipe with synthetic-resin powder and then to heat the metal pipe with one or more induction coils which are disposed along the exterior of the pipe or are displaced relative thereto. After an initial fusion of the particles along the inner wall of the tube or pipe, non-adherent particles are removed from the tube and the latter is again heated by induction to cause the synthetic-resin to flow or coalesce in a more or less continuous layer along the interior of the pipe. This system has the disadvantage that the filling of the pipe with synthetic resin must take place with the pipe in an erect position, thereby eliminating the use of the method for extremely long or relatively narrow pipes. Furthermore, the deposition of synthetic resin along the wall of the pipe is nonuniform and the reflowing step often yields a nonuniform product. There are even adhesion problems in many cases. Finally, it should be mentioned that the apparatus required for the internal coating of pipe or tubes in this manner is relatively complex and expensive, and it is difficult often to remove the particles packed therein.

OBJECTS OF THE INVENTION

It is, therefore, the principal object of the present invention to provide a method of coating a pipe, tube, duct or conduit (especially a pipe composed of iron, steel or other induction-heatable metal), with a thermally flowable substance (especially a thermoplastic synthetic resin) whereby the aforementioned disadvantages can be obviated.

Another object of the invention is to provide a system of relatively low-cost and low complexity which is especially adapted to the coating of a pipe or the like with a thermoplastic synthetic resin so as to yield a more uniform, homogeneous and continuous coating than has been attainable heretofore.

Still another object of the invention is to provide a method of internally coating an iron or steel pipe with synthetic resin which is effective in producing a uniform layer in long and narrow or thin pipe.

Yet another object of the invention is to provide a system for the internal and the external coating of pipes, tubes or the like whereby the aforementioned disadvantages can be obviated.

OBJECTS OF THE INVENTION

These objects and others which will become apparent hereinafter, are attained, in accordance with the present invention, in a system for the internal coating of elongated metal pipe, e.g. relatively long but narrow or thin steel pipe, which comprises maintaining the cold pipe or tube in a generally horizontal orientation, sweeping a gas stream entraining synthetic-resin particles through the horizontally oriented pipe, induction-heating the pipe progressively by relatively displacing the pipe and an induction coil surrounding same during passage of the particle-containing gas stream to cause the particles to adhere substantially uniformly to the interior of the pipe. Thereafter, in accordance with an important feature of the invention, a particle-free gas stream is caused to flow through the pipe, thereby sweeping any nonadhering particles therefrom while the coil and pipe are relatively displaced in the opposite direction to inductively heat the pipe to a temperature sufficient to cause flowing of the thermoplastic material and the formation of a uniform coating thereof.

In more general terms, the invention resides in a method of coating metal pipe, tube, duct or conduit bodies in which the elongated body is contacted by a mobile suspension of thermoplastic synthetic-resin particles, fusible to a surface of the body, either interior or exterior, so that on heating thereof by relative displacement of the body and an induction coil in one direction, the particles are fritted onto the surface while the surface coating of the particles is caused to coalesce into a uniform film in a subsequent heating stage. When the process is carried out within the pipe or tube, a further gas stream free from particles, is used to clear nonfritted or nonadherent particles therefrom.

According to another feature of the invention, the solids concentration or density of the particle-entraining gas stream first traversing the pipe is held at a level corresponding to the solids transfer to the metal surface. In other words, the quantity of particles (synthetic-resin powder) charged into the gas stream should equal the quantity deposited therefrom by fritting onto the inner wall of the tube.

Of course, the apparatus aspects of the invention permit numerous variations of structure within the basic concept. For example, the induction coil may be held stationary, while the steel pipe is displaced to effect the relative movement mentioned earlier. This is especially advantageous where externally long tubes are involved and problems of supporting the tube arise. Of course, the tube may be held stationary while the induction coil is displaced and both tube and coil may be movable to effect the relative displacement as desired. Furthermore, it has been found to be advantageous to provide cooling means on both sides of the induction coil, i.e. on both its inlet and discharge sides, the cooling means preferably being a water bath, spray head, trickle cooling, or like device. Water-circulating means may be provided to cool the liquid intended to contact the pipe, the cooling cycle being provided with a water tower or the like for dissipating heat into the atmosphere.

According to yet another feature of the invention, the gas-circulating system includes a single blower for both the particle-entraining gas and for the particle-free sparging gas. At the intake to this blower, there is provided a particle-removing device, e.g. a dust-separating cyclone, filter or precipitator, so that the recycled gas bed to the blower is substantially free from particles. At the discharge side of the blower, two branches may be provided, the first having a venturi for entraining solid particles while the other is free from any device designed to intoduce particles into the gas stream. Both branches may terminate in a distributing valve for selectively connecting a duct feeding the pipe to be treated with one or the other branch.

As mentioned briefly earlier, the present invention contemplates also the simultaneous external coating of the pipe using inductive heating and a fluidized bed of synthetic-resin particles through which the pipe is drawn. According to this aspect of the invention, the mobile particles are maintained in a fluidized-bed in a vessel whose perforated or porous walls are supplied with fluidizing gas and which also received the induction heating coil. The vessel is provided with means for shifting it transversely to the pipe, i.e. for raising and lowering it relative to the pipe, the exterior of the pipe is thus coated with the particles during the first relative displacement of the pipe and the induction-heating coil whereby the vessel is lowered on the second pass at which time the externally fritted particles are fused together.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
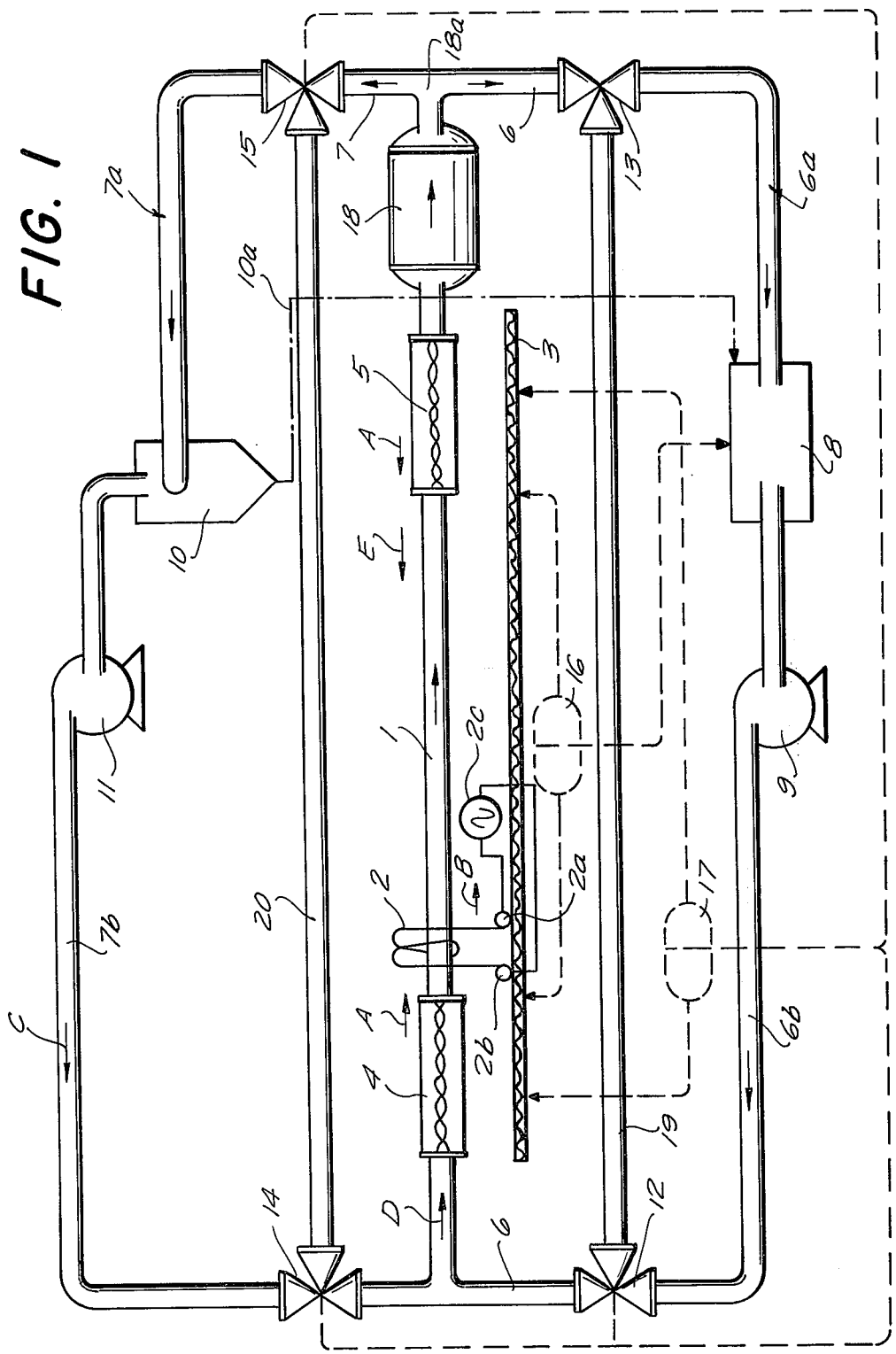
FIG. 1 is a flow diagram of an apparatus for internally coating a steel pipe with synthetic resin according to the invention, the induction-heating coil moving with respect to the pipe.

In FIG. 1 there is shown a device for the internal coating of a pipe 1 which comprises a pair of holders 4 and 5 gripping the ends of the pipe and diagrammatically shown to be lazytongs or braided-wire seal arrangements which clamp the tube 1 axially (arrows A) and register with the internal cavity of the tube for delivering fluids thereto. An induction coil 2 surrounds the pipe 1 and is movable in the direction of arrow B by a motor which may be coupled with the coil via a leadscrew. A track 3 supports the horizontally movable induction coil 2 and provides a pair of contact rails for the terminals 2a and 2b which are transversely spaced apart on the track.

A source of induction heating current is represented at 2c and is shown to be connected to the induction heating coil 2 although, in actuality, this source will be connected to the rails engaged by the shoes 2a and 2b.

At the downstream side of the pipe 1 to be coated is a gas cooler 18 which communicates via a Tee 18a with branches 6 and 7 of a pair of gas-flow circuits 6a and 7a. The gas-flow circuit 7a includes a three-way distributing valve 15 which communicates with a bypass pipe 20 opening into the three-way controlled valve 14. Another branch of the powder-free circuit includes a cyclone separator 10 into which the gas stream flows tangentially. The powder collected in the dustbin of the separator is returned to the particle-circulating path 6a as represented at 10a. The powder-free gas is then drawn from the cyclone 10 through the pump 11 and forced into the direction of arrow C via a branch 7b of the circuit to another port of the valve 14.

Similarly the powder circuit includes a bypass 19 between valves 12 and 13 and a branch 6b, downstream of blower 9 which delivers the powder-entraining gas to the pipe 1 through a further branch 6c. At 8, there is shown a controlled powder-feed device for metering the synthetic-resin powder into the gas stream.

In operation, blowers 9 and 11 are driven continuously and therefore may operate with maximum efficiency. At the beginning of a cycle, a cool pipe 1 is clamped between the seals 4 and 5 and a particle-containing gas stream is caused to flow from circuit 6a through the pipe in the direction of arrows D. For this purpose, valve 12 is opened to connect lines 6b and 6c and to close off the bypass 19. Valve 13 is open to connect branch 6 to the particle-feed device 8 and the blower 9. The controller 16, which is a pulse generator connected to the movement of the induction coil 2, triggers the feeder 8 to meter synthetic-resin powder into the gas stream in step with movement of the induction coil whereby the quantity of powder in the gas stream may be held substantially equivalent to that which is deposited from the gas. Meanwhile, valves 14 and 15 have been set to recirculate all of the air from blower 11 through the bypass 20. The induction heating coil 2 is displaced in the direction of arrow B along the pipe 1, thereby heating the latter to a temperature sufficient to frit the particles from the gas stream onto the inner surface of the pipe. The heated gas stream is cooled at 18 and is recycled through the feeder 8 to be replenished with respect to its particle content. A limit-switch arrangement or position-generating device 17 is also provided to respond to the induction coil 2 so that, when the latter reaches its extreme right-hand position, a pulse is produced to switch over the valves 14, 15 and 12, 13, the induction coil being thereupon moved in the opposite direction (arrow E). Upon such switchover, the particle-free gas from line 7b is fed to the pipe 1 and any loose particles are entrained to the cyclone 10. Meanwhile, particle-entraining gas is recirculated through the bypass 19. The induction heating coil thus raises the temperature of the pipe to a level sufficient to cause the deposited thermoplastic along the interior to flow. The result is a smooth uniform coating or film of the thermoplastic in the interior of the pipe.

Figure 2:
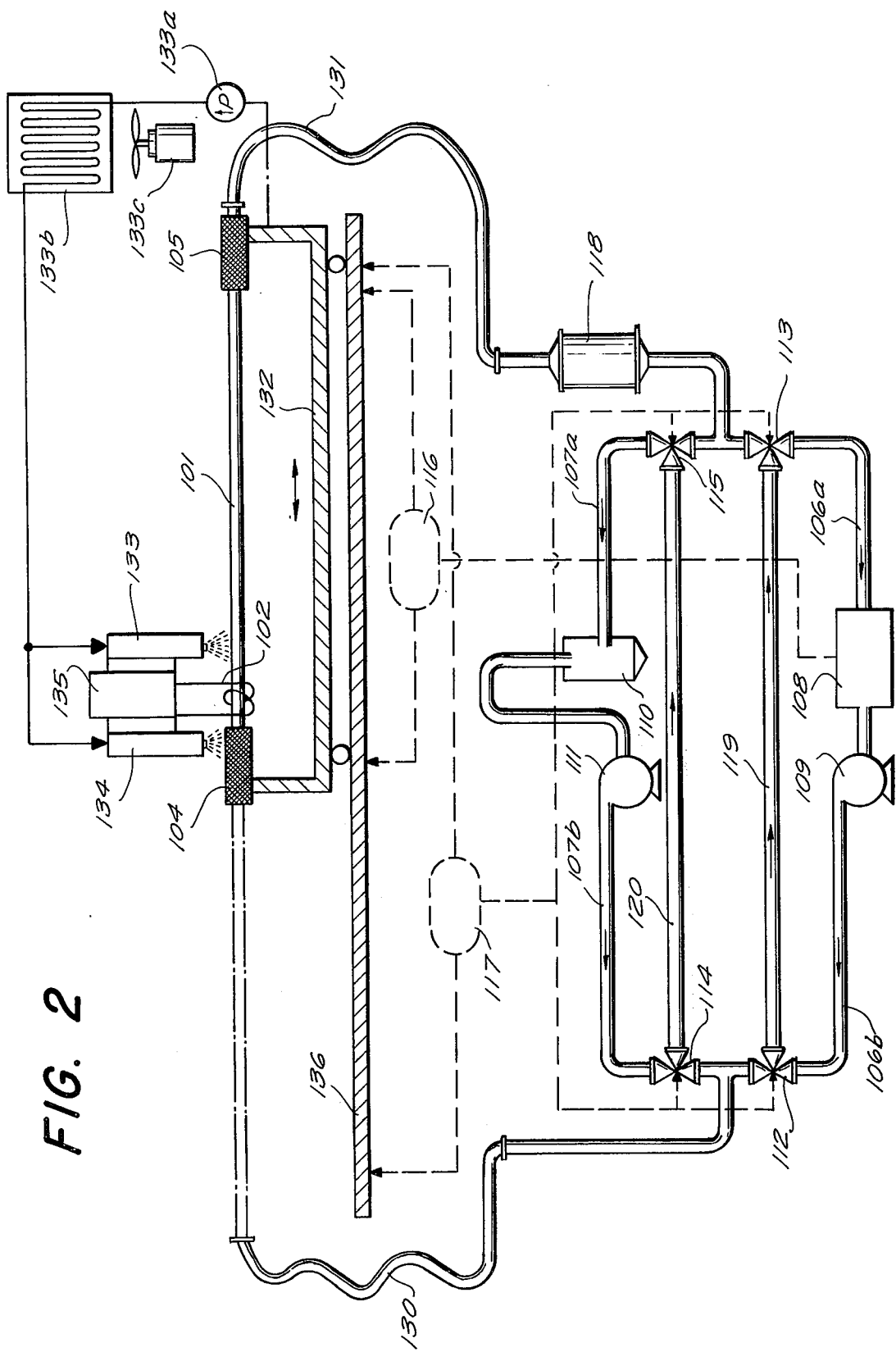
FIG. 2 is a diagram similar to FIG. 1 but illustrating an embodiment of the invention wherein the pipe to be coated is displaced with respect to the induction-heating coil.

In FIG. 2, there has been shown a variation of the system of FIG. 1 wherein the pipe 101 is held within a pair of sealing sleeves 104 and 105 mounted upon a carriage 132 which rolls upon a support 136 constituting a rail system of the character previously described. In this case however, the induction coil 102 is stationary and is mounted upon its high-frequency generator 135 which is flanked by a pair of water spray coolers 133 and 134. The water from these coolers may be collected in the trough formed by the support 132 and recirculated via a pump 133a and a heat exchanger 133b to the spray devices 133 and 134. A blower 133c can be used to cool the water.

The gas circulation systems of this embodiment are similar to those of FIG. 1 but are shown to be connected by flexible hoses 130 and 131 with the seals 104 and 105. As in the system of FIG. 1, a blower 109 in the particle circulation system feeds the particle-entraining gas to a line 106b which communicates with the valve 112 and with the hose 130 to feed the pipe 1 when the latter is in its extreme left-hand position shown in dot-dash lines in FIG. 2. A particle-depleted gas is returned through valve 113 and replenished in the metering device 108. Meanwhile the particle-free gas is recycled through bypass 120 via blower 111. When the limit-switch arrangement 117 registers a complete traversal by the pipe 101 of the induction coil 102, the valves 112, 113, and 114, 115 are switched over to bring into play the particle-free gas stream via the recirculating path 107a. The blower 111 thereupon forces the particle-free gas through line 107b and via hose 130 into the pipe 101 which is displaced to the left through the induction coil for flowing of the deposited synthetic resin. A particle-containing gas from blower 109 is meanwhile recirculated through the bypass 119. After cooling, the gas recovered from the pipe 101 via hose 131 is cooled at 118 and subjected to dust separation in cyclone 110. A pulse generator 116 responsive to the movement of the pipe through the induction coil, triggers the release of synthetic-resin particles into the gas stream. Suitable position-indicating systems are described at pages 44 ff. of SERVOMECHANISM PRACTICE, McGraw-Hill Book Co., New York, 1960. The metering device 8, 108 may be any of those described in Chapter 7 of PERRY'S CHEMICAL ENGINEERS' HANDBOOK, McGraw-Hill Book Co., New York, 1963.

Figure 3:
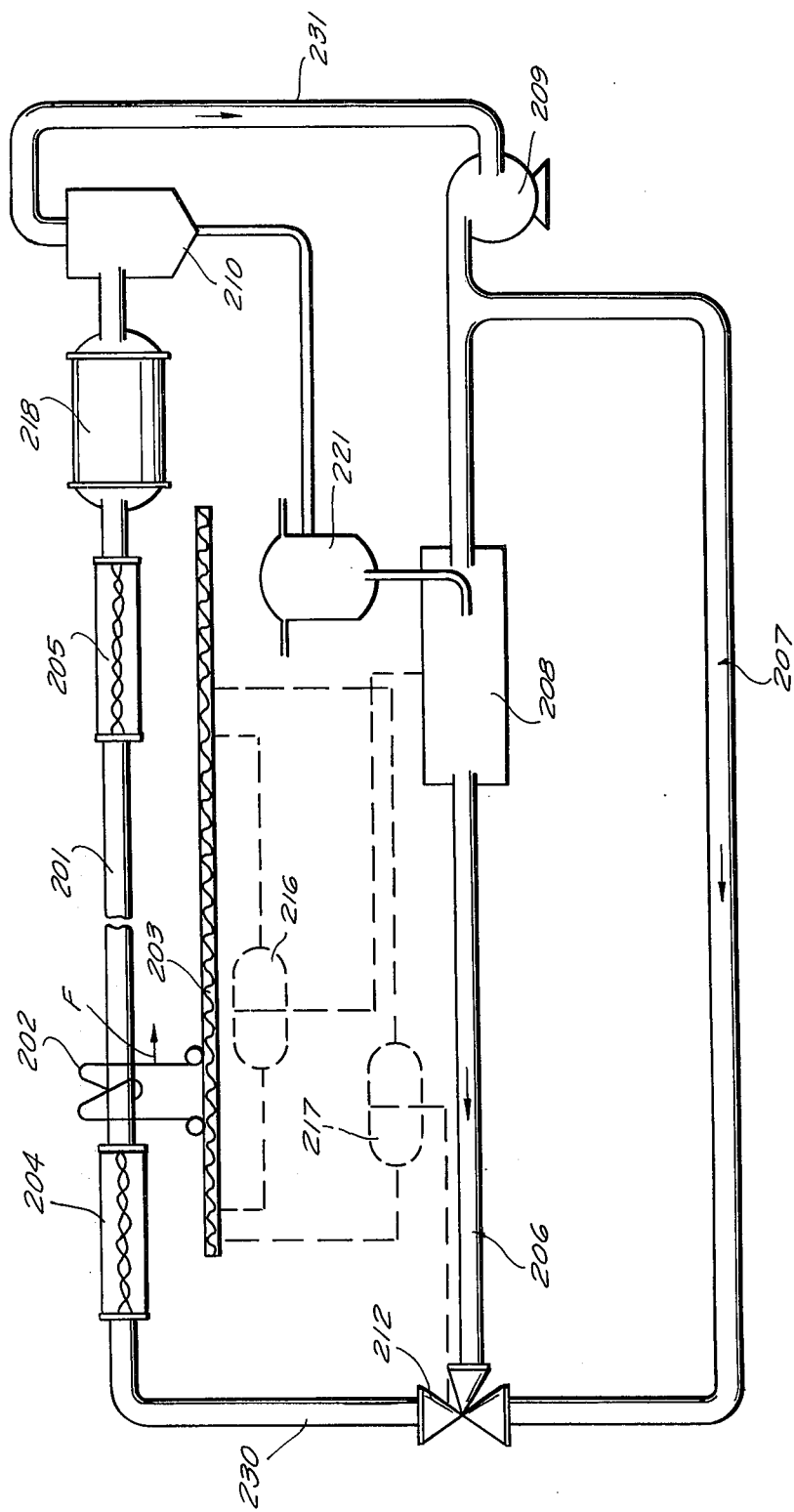
FIG. 3 is a diagram of a system for the purposes described wherein only a single blower is used for both gas circuits.

FIG. 3 shows a variant of the system of the present invention which is intended to allow a single blower 209 to serve for both gaa circulations. In this embodiment, the pipe 201 to be coated is fixed between the clamping seals 204 and 205 and is surrounded by a movable induction coil 202 which cooperates with the track 203, the limit-switch arrangement 217 and the position-indicating device 216, all as previously described in connection with FIG. 1. In this embodiment, however, the blower 209 feeds branches 206 and 207 in parallel, the branches terminating in respective ports of a single three-way controlled distributing valve 212. A line 230 connects the valve 212 with seal 204 and the pipe 201 while a single return pipe 231 feeds the blower 209. The discharge side of the pipe 201 is fitted with a cooler 218 and with a dust-removal cyclone 210, the solids of which are supplied to a storage hopper 221 feeding the metering device 208. The gas output from the cyclone 210 is, of course, connected to line 231. It will be apparent that, in one position of the valve 212, the particle-laden gas stream from line 206 is passed through the pipe 201 as the induction coil is shifted in the direction of arrow F. When the induction coil 201 reaches the limit of its traverse, the switching system 217 reverses the direction of movement of the induction coil and simultaneously switches valve 212 to permit particle-free gas to flow via line 207 through the pipe. The gases emerging from the pipe, in both cases, are cooled, freed from particulates in cyclone 210 and delivered to the blower 209.

Figure 4:
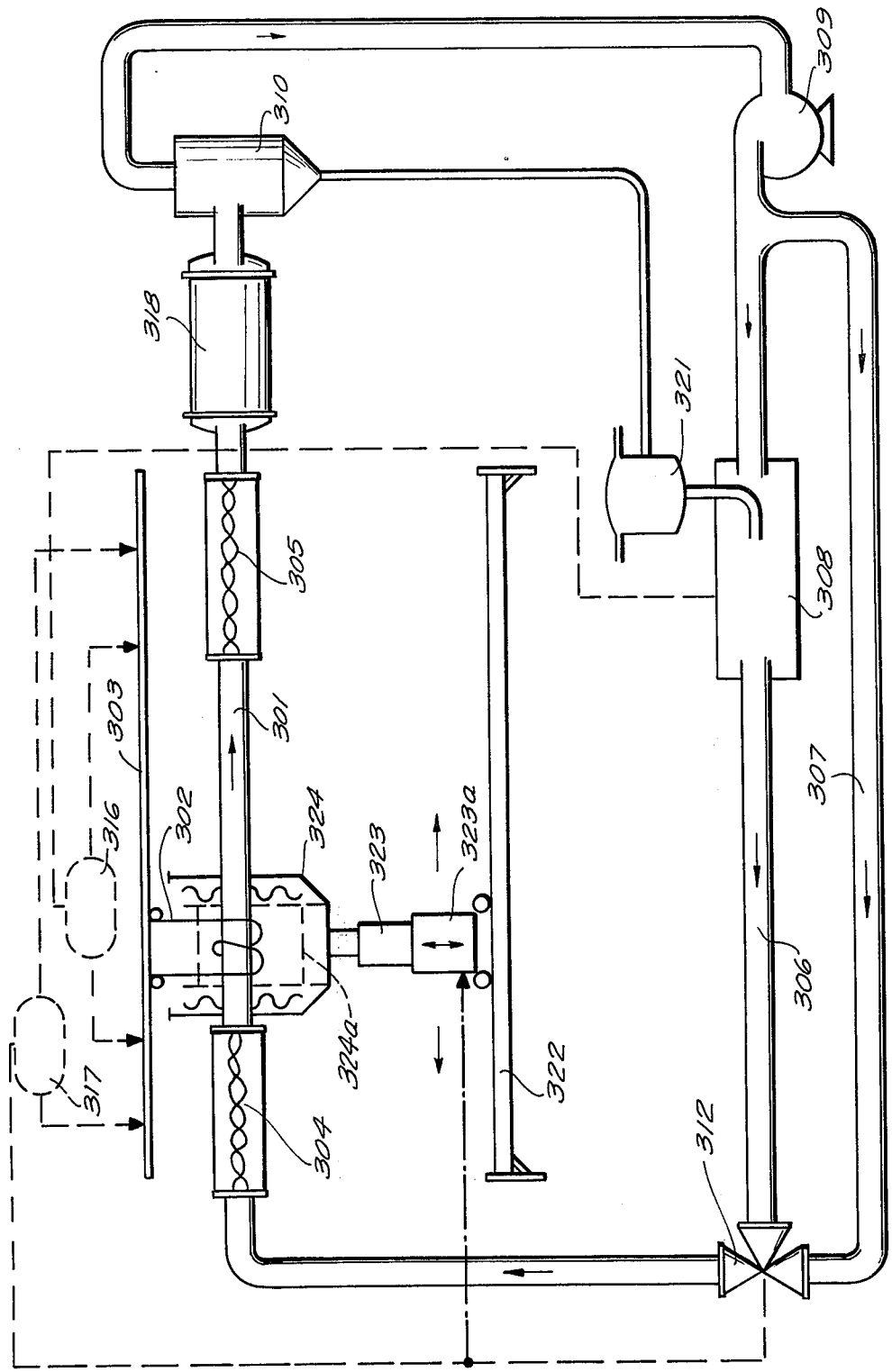
FIG. 4 is a diagram similar to FIG. 3 but showing a system provided with means for externally coating the pipe.

FIG. 4 shows a modification of the system of FIG. 3 wherein the pipe 301 is permitted to enter a vessel 324 which is carried upon a vertically displaceable jack 323 on a carriage 323a shiftable longitudinally along rails 322. In the raised position of the vessel 324, which has at least a perforated floor at 324a through which a fluidizing gas is forced by a blower not shown, the exterior of the pipe 301 is coated with the particles while the interior is coated as described with reference to FIG. 3. In other words, the pipe 301 is fixed between sealing clamps 304 and 305 which communicate with a valve 312 and a cooler 318, respectively. The valve 312 is, of course, controlled by the position generator 317 in response to the location of the induction coil 302 which runs along a track 303. Another position generator 316 controls the powder-metering device 308 as previously described. The single blower 309 is supplied with particle-free gas from the cyclone 310 downstream of the coolers 318 and the recovered powder is delivered to a hopper 321 feeding the metering device 308. In the initial position of the valve 312, controller 317 drives the carriage 323a to the right with the vessel 324 in its raised position, the induction coil 302 being similarly removed to the right to heat the pipe 301. Particle-entraining gas is fed from line 306 through the valve 312 and the pipe 301 as the latter is heated to internally frit synthetic-resin particles to the pipe. Simultaneously, fluidizing gas is supplied to the vessel 324 to produce a mobile gas vortex along the exterior of the pipe and thereby cause the synthetic-resin particles to frit to the latter. When the coil 302 reaches its extreme right-hand position, controller 317 reverses the drive for carriage 323a and causes the vessel 324 to lower, thereby withdrawing the pipe 301 from the fluidized bed. Movement of the induction coil 302 to the left flows the synthetic resin into a smooth layer. At the instant of this reversal, three-way valve 312 is switched over to connect line 307 of the particle-free gas cycle to pipe 301.

Figure 5:
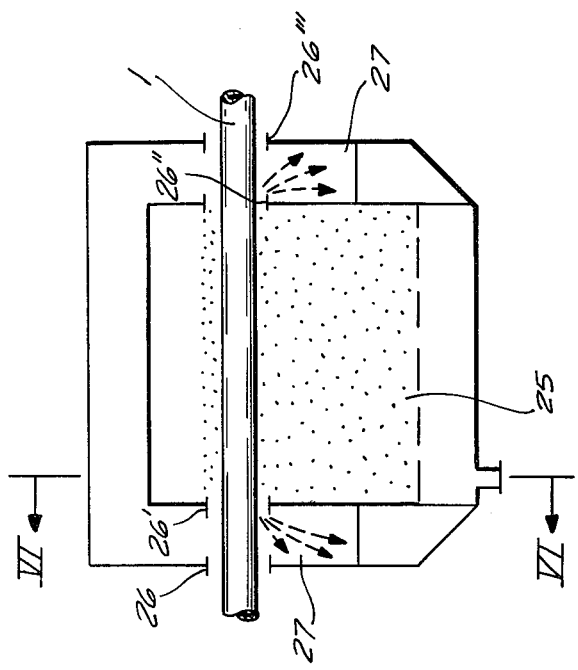
FIG. 5 is a longitudinal cross-sectional view in diagrammatic form, illustrating a vessel for the external coating of a pipe.
Figure 6:
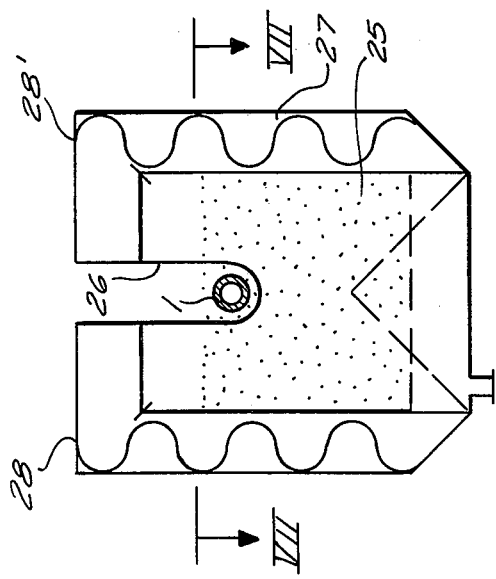
FIG. 6 is a cross-sectional view taken along the line VI—VI of FIG. 5.
Figure 7:
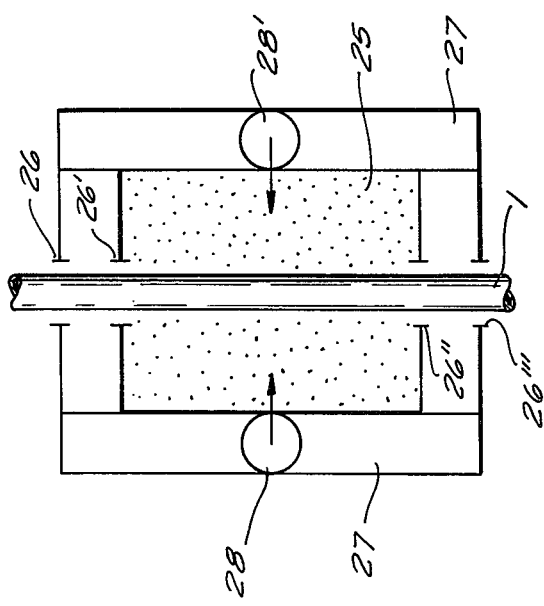
FIG. 7 is a view taken along the line VII — VII of FIG. 6.

In FIGS. 5 – 7 there is shown a vessel for use in the external coating of pipe according to the present invention. In this drawing, the pipe is represented at one while the openings 26, 26′, 26″ and 26‴ of the double-wall vessel, which are provided with shutters or diaphragm-type seals, are shown to accommodate the pipe. The outer chamber 27 serves to collect overflowing powder elevator devices are provided at 28 and 28′. The operation of this vessel has already been described in connection with FIG. 4 and will be apparent therefrom. It is desirable, however, to note that the openings 26 etc. are cradles which allow vertical displacement of the vessel relative to the pipe. In the coating position shown in FIGS. 5 – 7, the pipe is disposed below the level of the fluidized bed and is coated with the particles, with the aid of an induction heating coil as described earlier. Overflowing powder is collected at 27 and is led by inclined surfaces to the elevators 28 and 28′ from which the powder is dumped again into the bed.

The system described above has numerous advantages, especially because the resulting layers are homogeneous, highly adherent and of any required thickness. They also are of uniform thickness throughout the length of the tube. The invention is applicable to pipes which may be coated in a straight condition but are thereafter to be bent or otherwise deformed. It has been found to be suitable for pipes with internal diameters as small as 8 to 25 mm and of lengths ranging from 7 to 14 meters. The coating has been found to be uniform and adherent even at critical locations at the ends of the pipes and the handling of the system has been found to be simple and convenient, namely because of the horizontal positioning of the pipe. The device may operate automatically with minimum supervision and works substantially free from loss of synthetic-resin powders. It may make use of any thermally fusible powder, especially thermoplastic synthetic resins such as polyamides, polyolefins and polyvinyl compounds, and alos certain thermosetting resins which, before they harden, possess a flowable state. The latter resins include phenolic resins, polyesters and epoxy resins. It has also been found to be suitable with elastomers, especially butadiene-styrene polymers. The preferred resins are, however, the thermoplastic resins mentioned earlier.

The powders which may be employed can have a wide range of particle size, e.g., from 5 to 300 microns although best results are obtained with fine powders with a particle size in the range of 5 to 50 microns and which cannot be used effectively in fluidized beds. The external coatings may be carried out with particles of a particle size at the other end of the indicated range. It will be apparent, although not illustrated, that several pipes can be coated in parallel to one another using one gas circulation system and a single large generator for a number of induction coils. In this case, the coils may be held stationary as illustrated in FIG. 2. The system of FIGS. 3 and 4 has the additional advantage that powder does not reach the blower and encrustation thereof is avoided. The inner coating should be of the order of 150 microns while the outer coating can have a thickness of 250 microns in the preferred mode of operation.

SPECIFIC EXAMPLES

EXAMPLE I

Using the system illustrated in FIG. 1, a cast-steel pipe with a length of 4000 mm and an internal diameter of 20 mm (wall thickness 2 mm) was clamped between a pair of seals composed of braided metal sleeves surrounded by polytetrafluorethylene layers. The powder-laden gas stream was fed through the pipe and contained polyundecaneamide powder in a particle size of 10 – 100 microns and at a rate of 1500 g/m³ of gas (STP). The induction coil was displaced along the pipe 1 at a rate of 2 m/min. and energized at 400 volts from a generator having an output of 10 kw. Within the pipe, the temperature reached 250° C. at its inner wall and particles of the synthetic resin were fritted onto the inner surface. The gases emerging from the pipe were cooled at 18 to the starting temperature of about 20° C. Using the pulse generator and position-signaling device 16, the metering unit 8 introduced a powder quantity of about 40 g substantially continuously. During the return movement of the induction coil, using the same conditions but with the powder-free air, the fritted coating was converted into a uniform smooth and highly adherent layer with a thickness of 150 microns.

EXAMPLE II

In an apparatus as illustrated in FIG. 1, a pipe having a length of 4000 mm, an internal diameter of 20 mm and a wall thickness of 2 mm, was coated internally with polyethylene powder using the system generally described in Example I. The polyethylene powder had a density of 0.918 g/cm³ and a melting index of 1.5 g/10 minutes. The powder had a particle size of 50 to 150 microns and was charged into the gas stream at a rate of 1800 g/m³ (STP). The induction coil 2 was displaced with a linear speed of 2.5 m/min. and was energized as described in Example I. A temperature of 240° C was generated along the inner wall of the pipe which was coated with a uniform fritted-powder layer. 55 g of the powder was metered continuously into the gas stream. The smooth adherent layer of polyethylene, formed on reversal of the movement of the induction coil, had a thickness of about 220 microns.

EXAMPLE III

The pipe of Example II was coated in an apparatus as shown in FIG. 2 with polyundecaneamide powder in a particle size of 10 – 100 microns and a quantity of 1500 g/m³ (STP) of the gas. The pipe was displaced at 2 m/min. through the induction coil which was energized as described in Example I. The temperature along the inner wall of the pipe was 250° C. and water was triggered onto the pipe for cooling to a temperature just below the melting point of the synthetic resin. The pipe was then reversed in direction and the particle-free gas conducted therethrough. The cooling sprays were also cut off for the return pass. The resulting smooth highly adherent layer had a thickness of 150 microns.

EXAMPLE IV

Using the system illustrated in FIG. 3, a cast-iron pipe as described in Example II is internally coated at a rate of 5g/sec. with polyundecaneamide powder with a particle size of 10 – 100 microns. The gas streams are led through the pipe at rates of about 6 m/second, the induction coil being shifted with a linear velocity of 2 m/min. While being energized as described in Example II. The temperature at the interior of the pipe is found to be about 250° C. During the reverse movement of the induction coil the particle-free gas is conducted through the pipe, the resulting layer having a thickness of 150 microns.

EXAMPLE V

The pipe described in Example I is coated with polyundecameamide powder at a rate of 5 g/second, the particle size being 10 – 100 microns. The gas velocity through the pipe, both for the particle-laden gas and the particle-free gas, is 6 m/sec. and the linear velocity of the induction coil is 2 m/min. The coil is energized as described in Example I. A temperature of 250° C is achieved at the wall of the pipe and a uniform powder layer is fritted thereon.

Simultaneously, a fluidized bed is raised to surround the pipe (FIG. 4) and is charged with polyundecameamide powder with a particle size of 40 to 200 microns. The fluidized bed is displaced along the pipe with the same speed of 2 m/min. A uniform external coating of 250 microns and a uniform internal coating of 150 microns in thickness were obtained when the induction coil is reversed for the return pass and the fluidized bed vessel is lowered.

What is claimed is:

1. A method of internally coating an elongated iron or steel pipe, comprising the steps of:
   a. clamping said pipe between seals and incorporating it in a closed gas-circulating system;

b. relatively displacing said pipe in a first direction through an induction coil to heat said pipe along the inner surface thereof;

c. sweeping a gas stream along said heated surface;

d. charging said gas stream with particles of a synthetic resin flowable at an elevated temperature, said particles having a particle size of 5 to 300 microns and being charged into said gas stream at a rate of up to 2000 g/m$^3$ (STP) thereof whereby said gas stream entrains said particles and said particles are fritted to said inner heated surface;

e. cooling said gas stream upon its emergence from said inner heated surface;

f. recharging said cooled gas stream by metering additional synthetic-resin particles at substantially the same rate at which said particles are fritted to said inner heated surface;

g. recirculating said recharged cooled gas stream into contact with said inner heated surface to frit additional synthetic-resin particles onto said surface;

h. separating excess resin particles nonadherent to said surface from said gas stream upon its emergence from contact with said inner heated surface to form a particle-free gas stream;

i. cooling said particle-free gas stream;

j. recirculating said cooled particle-free gas stream while simultaneously induction-heating said pipe with said coil to effect coalescence of said resin particles fritted to said inner surface by relatively displacing said pipe and said coil in the opposite direction to the movement in step (b); and k. cooling said resin-coated pipe to room temperature.

2. Process of claim 1, wherein said pipe is maintained in a generally horizontal orientation while being internally coated.

* * * * *